(12) United States Patent
Egedal et al.

(10) Patent No.: US 8,897,922 B2
(45) Date of Patent: Nov. 25, 2014

(54) WIND FARM POWER CONTROL BASED ON MATRIX REFLECTING A POWER LOAD DISTRIBUTION BETWEEN INDIVIDUAL WIND TURBINES

(75) Inventors: Per Egedal, Herning (DK); Ramakrishnan Krishna, Skjern (DK)

(73) Assignee: Siemens Aktiengesellschaft, Munich (DE)

( * ) Notice: Subject to any disclaimer, the term of this patent is extended or adjusted under 35 U.S.C. 154(b) by 794 days.

(21) Appl. No.: 13/008,162

(22) Filed: Jan. 18, 2011

(65) Prior Publication Data

US 2011/0175353 A1 Jul. 21, 2011

(30) Foreign Application Priority Data

Jan. 20, 2010 (EP) ..................... 10000543

(51) Int. Cl.
*G05D 5/00* (2006.01)

(52) U.S. Cl.
USPC ............................. 700/287; 290/44

(58) Field of Classification Search
CPC ...... F03D 7/043; F03D 7/028; F05B 2240/96
USPC ....... 290/44, 55; 415/1; 416/1; 700/286, 287, 700/288, 290
See application file for complete search history.

(56) References Cited

U.S. PATENT DOCUMENTS

| | | | | |
|---|---|---|---|---|
| 5,424,942 A * | 6/1995 | Dong et al. | ...................... | 700/44 |
| 5,905,666 A * | 5/1999 | Hoffman et al. | ................ | 700/99 |
| 7,844,352 B2 * | 11/2010 | Vouzis et al. | .................... | 700/44 |
| 8,039,981 B2 * | 10/2011 | Egedal et al. | ................... | 290/44 |
| 8,078,291 B2 * | 12/2011 | Pekar et al. | ...................... | 700/28 |
| 2001/0034560 A1 * | 10/2001 | Krogmann | ....................... | 700/31 |
| 2003/0149511 A1 * | 8/2003 | Rizzotto et al. | ............... | 700/262 |
| 2007/0168067 A1 * | 7/2007 | Yaji et al. | ....................... | 700/100 |
| 2007/0299548 A1 * | 12/2007 | Weitkamp | ........................ | 700/52 |
| 2008/0097625 A1 * | 4/2008 | Vouzis et al. | .................... | 700/29 |
| 2010/0168893 A1 * | 7/2010 | Yaji et al. | ....................... | 700/100 |
| 2011/0054693 A1 * | 3/2011 | Dean | .............................. | 700/275 |
| 2012/0173172 A1 * | 7/2012 | Laurberg et al. | ................. | 702/56 |

FOREIGN PATENT DOCUMENTS

| | | |
|---|---|---|
| CN | 100339594 C | 9/2007 |
| CN | 100523491 C | 8/2009 |
| DE | 102004056254 A1 | 6/2006 |
| EP | 1672779 A2 | 6/2006 |
| EP | 173664 A1 | 12/2006 |
| EP | 1790851 A2 | 5/2007 |
| WO | WO 2006/066797 A1 | 6/2006 |

\* cited by examiner

*Primary Examiner* — Julio C. Gonzalez

(57) ABSTRACT

A method for controlling the operation of a wind farm with a plurality of wind turbines is disclosed A setpoint vector is defined, wherein each component of the setpoint vector represents an individual power setpoint of one of the plurality of wind turbines. A dependency matrix, which reflects a desired power generation distribution between different wind turbines of the plurality of wind turbines, is determined. A power reference vector is calculated by multiplying the dependency matrix with the setpoint vector, such that the power reference vector comprises a coordinated power setpoint for each wind turbine. The operation of the wind farm is controlled based on the calculated power reference vector. A superordinate control system, a wind farm, a computer-readable medium and a program element, which are adapted for performing and/or for controlling the above described wind farm operation control method are further disclosed.

9 Claims, 1 Drawing Sheet

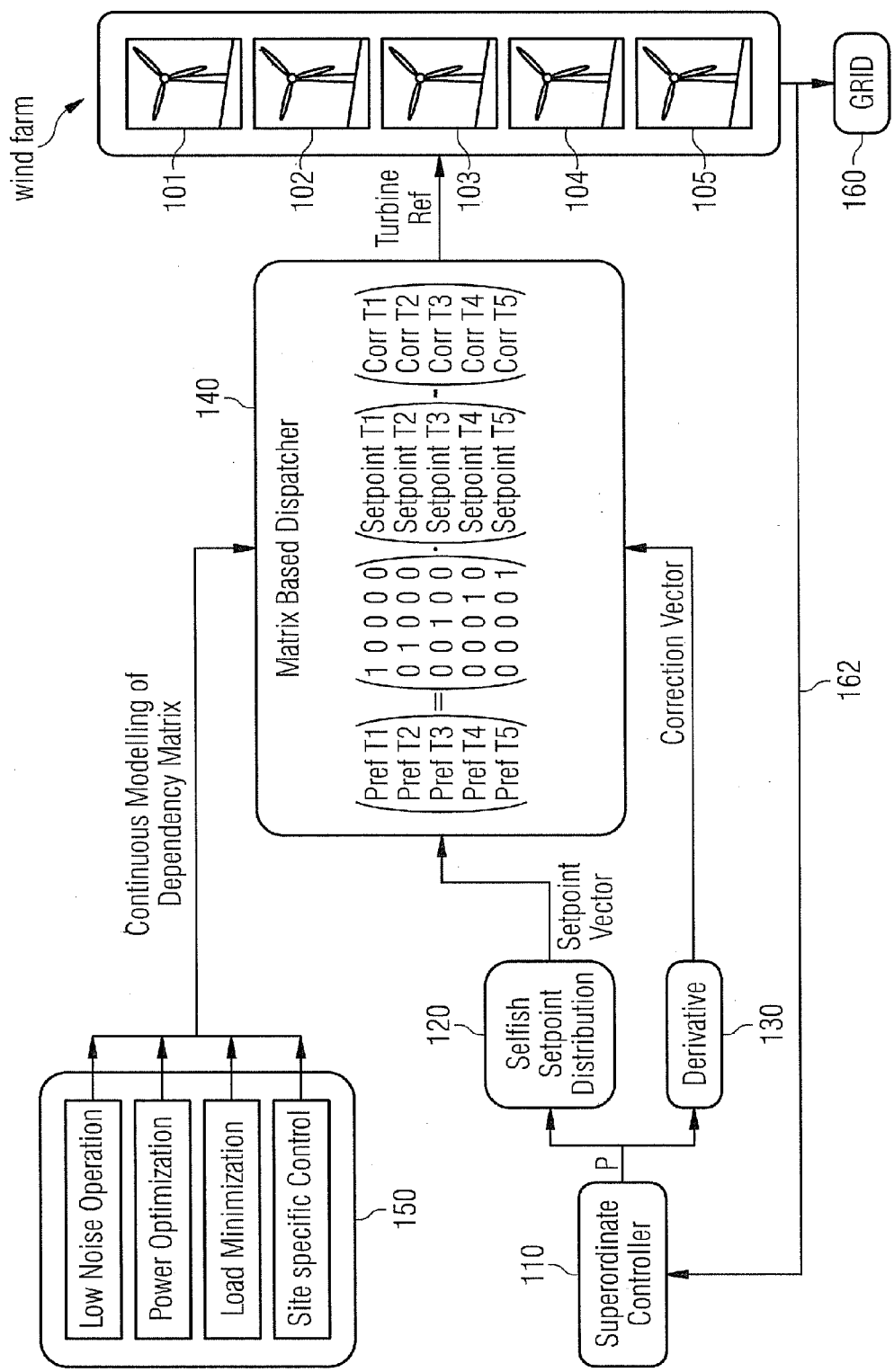

WIND FARM POWER CONTROL BASED ON MATRIX REFLECTING A POWER LOAD DISTRIBUTION BETWEEN INDIVIDUAL WIND TURBINES

CROSS REFERENCE TO RELATED APPLICATIONS

The application claims the benefit of the provisional patent application filed on Jan. 20, 2010, and assigned application number 1000543.8, and which is incorporated by reference herein in its entirety.

FIELD OF INVENTION

The present invention relates to the technical field of controlling the operation of wind turbines which are combined to a wind farm.

ART BACKGROUND

A wind farm is a group of wind turbines, which are located in the same area and which are used for producing electric power. Typically, individual wind turbines of a wind farm are interconnected with a medium-voltage power collection system and a communications network. At an electric substation, a medium-voltage electrical current is increased in voltage by means of a transformer in order to feed the resulting high voltage power to a high voltage transmission system.

A large wind farm may consist of a few dozen and up to several hundred individual wind turbines and cover an extended area of hundreds of square kilometers. Typically, each individual wind turbine is equipped with an individual control unit, which controls and regulates the operation of the wind turbine for instance based on an individual power setpoint being indicative for the actual electric power generation of the wind turbine. Furthermore, there is a superordinate wind farm control unit, which monitors the operation of the entire wind farm and of the individual wind turbines. Via a data line to the individual control units, the superordinate wind farm control unit can collect information regarding the individual wind turbines and transmit appropriate control signals to the respective individual control units. For instance, it is known to stop all wind turbines of a wind farm through a central stop command of the wind farm control unit and to cut off the wind farm completely from the grid.

Specifically, the superordinate wind farm control unit manages a correction of the overall wind farm power output, such that an appropriate overall power production of the wind farm can be achieved. This is accomplished by a superordinate power setpoint for the overall power production. In order to realize an appropriate overall wind farm power output, based on the superordinate power setpoint an appropriate individual power setpoint has to be determined for each wind turbine. This determination is typically carried out by means of a separate algorithm.

The conversion from (a) a superordinate power setpoint value, which may also be called a wind farm power reference value, to (b) individual power setpoints, which may also be called wind turbine reference values, yields a large span of possibilities and given degrees of freedom corresponding to the number of wind turbines in the wind farm. Functions used for this conversion can take several things into account, but the goal is typically to control the wind farm as one power plant, instead of controlling all individual wind turbines separately.

In order to adapt this kind of collective control it is necessary to have a tool that interconnects the whole wind farm regarding the setpoint distribution. This means that an assigned setpoint for a first wind turbine will be a direct function of the assigned setpoint of a second wind turbine in the wind farm. One option for realizing this would consist in a sequential or iterative setpoint calculation. Thereby, the wind turbine settings would be managed in a "top to bottom" running program. Doing this however would complicate the respective algorithm further in particular in terms of data management, and will also lead to slower program.

Based on the above considerations, there may be a need to provide a procedure for effectively managing the dependencies between different individual wind turbine set points.

SUMMARY OF THE INVENTION

This need may be met by the subject matter according to the independent claims. Advantageous embodiments of the present invention are described by the dependent claims.

According to a first aspect of the invention there is provided a method for controlling the operation of a wind farm comprising a plurality of wind turbines. The provided method comprises (a) defining a setpoint vector, wherein each component of the setpoint vector represents an individual power setpoint of one of the plurality of wind turbines, (b) determining a dependency matrix, which reflects a desired power generation distribution between different wind turbines of the plurality of wind turbines, (c) calculating a power reference vector by multiplying the dependency matrix with the setpoint vector, such that the power reference vector comprises a coordinated power setpoint for each wind turbine, and (d) controlling the operation of the wind farm based on the calculated power reference vector.

The described control method is based on the idea that an efficient and in particular a fast operational control of a wind farm comprising a plurality of wind turbines can be accomplished by means of a matrix based calculation, wherein (i) a setpoint vector representing an individual power setpoint for each wind turbine and (ii) a matrix reflecting individual dependencies between the supposed amount of power generation of different wind turbines are multiplied. The resulting power reference vector, which can be calculated without performing iterations, represents a coordinated power setpoint for each wind turbine.

Generally speaking, for controlling the operation of the wind farm individual dependencies between appropriate power generation amounts of different wind turbines can be taken into account in an efficient manner. The described method represents a power setpoint dispatch algorithm, which is a matrix based function.

The matrix based calculation of the power reference vector may be performed centrally by means of a central function for the whole wind farm. This central function may be realized within a central or a superordinate control system of the whole wind farm.

The requested power generation distribution may be homogeneous. This means that each wind turbine is supposed to generate the same amount of power. Such a situation may occur in particular if the plurality of wind turbines are of the same type and/or have the same operational age for instance with respect to a fatigue load which has so far been accumulated on relevant structural components (e.g. rotor blades) of the respective wind turbine. In this case the dependency matrix may be the identity matrix respectively the unit matrix.

The requested power generation distribution may also be inhomogeneous. In this document an inhomogeneous power generation distribution may also be denominated an inhomogeneous load distribution or an inhomogeneous dispatching within the wind farm.

An inhomogeneous distribution of power generation means that for any arbitrary reason one particular wind turbine is requested to produce more or less power with respect to at least one other particular wind turbine of the plurality of wind turbines. Thereby, the amount of "more power" or the amount of "less power" might be described by a dependency factor, which may be comprised in the dependency matrix as one or more matrix elements.

An inhomogeneous distribution of power generation may be in particular advantageous if the wind farm comprises different types of wind turbines. Further, an inhomogeneous power generation distribution might be advantageous if a different fatigue load has been accumulated so far on relevant structural components (e.g. rotor blades) of different wind turbines. For instance, in order to realize preferred maintenance intervals and/or a scheduled replacement of a structural wind turbine component, one wind turbine, which has so far suffered from higher mechanical loads, which have been acted onto at least on structural wind turbine component, should be operated in a more gentle manner i.e. with a reduced power generation as compared to another wind turbine, which has suffered only from a minor fatigue load accumulation.

The dependency matrix may be a quadratic matrix. This means that the number of lines may be the same as the number of columns.

According to an embodiment of the invention each individual power setpoint is determined based on an individual nominal power output of the respective wind turbine and a requested total power output of the whole wind farm.

The described dependency of the individual power setpoints from both the respective individual nominal power output and the requested total power output of the whole wind farm or of at least a selection of a plurality of wind turbines of the wind farm may provide the advantage that changes of the requested total power generation may be taken into account.

In this document the term "individual nominal power output" may particularly denote an amount of power generation of a particular wind turbine, which is operated in the most effective way with respect to a power generation.

According to a further embodiment of the invention the sum of all individual power setpoints corresponds to the requested total power output of the whole wind farm. This may provide the advantage that based on the individual nominal power outputs and based on the requested total power output the individual power setpoints can be determined easily.

If for instance the requested total power generation is a certain percentage of the total amount of power, which the wind farm would generate when being operated in the most effective manner, compared to the respective individual nominal power output the individual power setpoint for each wind turbine may be reduced by the same percentage. This may mean that the power generation of each wind turbine will be curtailed in the same relative manner as the total power generation of the whole wind farm has to be curtailed for instance in order to meet requirements given a grid being fed by electricity, which is produced by the whole wind farm.

According to a further embodiment of the invention calculating the power reference vector further comprises adding a correction vector to the result of multiplying the dependency matrix with the setpoint vector. Thereby, the correction vector comprises a power correction value for each wind turbine, whereby each power correction value is indicative for a requested time rate of change of the total power output of the wind farm.

The utilization of the described correction vector may provide the advantage that in particular fast temporal changes of the requested total power output of the wind farm, which occur for instance if a so called power output stepping is requested, can be taken into account without causing instabilities of the wind farm or of at least one wind turbine of the wind farm.

In this respect it is mentioned that for wind farms and in particular for wind farms with a large number of wind turbines an issue of large interest is a stepping (stepwise change) of (superordinate) setpoint or reference value for the actual power generation of the whole wind farm. When stepping such a (superordinate) reference value, it is appropriate to implement a corresponding change for each coordinated power setpoints for the respective wind turbine as quickly as possible. According to the embodiment described here such a behavior may be realized by a correction in the output power provided by every individual wind turbine. It is mentioned that also the described correction of the power reference vector may be performed centrally by means of the above described central function for the whole wind farm.

It is pointed out that mathematically a subtraction is an addition of a value having negative algebraic sign. Accordingly, in this document an addition may also comprise an addition of a value having negative algebraic sign.

According to a further embodiment of the invention each power correction value is proportional to the time derivative of the requested total power output of the wind farm. This may mean that the faster the change in time of the requested total power output is, the lager is the correction vector respectively the larger are the power correction values.

According to a further embodiment of the invention each power correction value is proportional to the negative time derivative of the requested total power output of the wind farm. This means that the power correction values will have a negative algebraic sign. As a consequence, when adding the correaction vector to the result of multiplying the dependency matrix with the setpoint vector, in case of an increase of the requested total output power the resulting coordinated power setpoints respectively the resulting coordinated power setpoint values will be reduced. Thereby, the reduction is proportional to the time derivative of the requested total power output of the wind farm. Correspondingly, if there is a decrease of the requested total output power the resulting coordinated power setpoints will be increased. Correspondingly, the amount of increase is proportional to the time derivative of the requested total power output.

The described proportionality to the negative time derivative may provide the advantage that sudden changes of the requested total power output will we forwarded to each wind turbine in a predictive manner. As a result the speed of the whole wind farm operation control may be increased significantly. This may yield in particular a higher performance of the superordinate control system such that for instance less overshoots will occur.

According to a further embodiment of the invention least one element of the dependency matrix depends on a type of operation of at least one wind turbine. The type of operation may be for instance a low noise operation, a power optimization, a mechanical load optimization of at least one structural component and/or any other site specific operation of at least one wind turbine. In this respect it is mentioned that the described list of operational modes is not exclusive. The type of operation may rather denote any operational mode, the application of which may result in an alteration of the power generation distribution throughout the wind farm.

According to a further aspect of the invention there is provided a superordinate control system for controlling the operation of a wind farm comprising a plurality of wind turbines. The provided superordinate control system comprises (a) a definition unit for defining a setpoint vector, wherein each component of the setpoint vector represents an individual power setpoint of one of the plurality of wind turbines, (b) a determination unit for determining a dependency matrix, which reflects a desired power generation distribution between different wind turbines of the plurality of wind turbines, (c) a calculation unit for calculating a power reference vector by multiplying the dependency matrix with the setpoint vector, such that the power reference vector comprises a coordinated power setpoint for each wind turbine, and (d) a control unit for controlling the operation of the wind farm based on the calculated power reference vector.

Also the described superordinate control system, is based on the idea that a fast and efficient operation control of a wind farm can be realized by means of a matrix based calculation, wherein (a) a vector representing an individual power setpoint for each wind turbine and (b) a matrix reflecting individual dependencies between different wind turbines are involved. The resulting power reference vector comprises a coordinated power setpoint for each wind turbine.

According to a further aspect of the invention there is provided a wind farm for generating electric power. The provided wind farm comprises (a) a plurality of wind turbines each comprising an individual control unit for controlling the operation of the respective wind turbine, and (b) a superordinate control system as described above. Thereby, the superordinate control system is connected to each individual control unit.

According to a further aspect of the invention there is provided a computer-readable medium on which there is stored a computer program for controlling the operation of a wind farm comprising a plurality of wind turbines. The computer program, when being executed by a data processor, is adapted for controlling and/or for carrying out the method as described above.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

According to a further aspect of the invention there is provided a program element for controlling the operation of a wind farm comprising a plurality of wind turbines. The program element, when being executed by a data processor, is adapted for controlling and/or for carrying out the method as described above.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the example of embodiment to be described hereinafter and are explained with reference to the example of embodiment. The invention will be described in more detail hereinafter with reference to the example of embodiment but to which the invention is not limited.

BRIEF DESCRIPTION OF THE DRAWINGS

The FIGURE illustrates a Matrix based dispatching algorithm for controlling the operation of a plurality of wind turbines of a wind farm.

DETAILED DESCRIPTION

A power setpoint dispatch algorithm in accordance with a preferred embodiment of the invention is based on a product of a matrix based function. According to the embodiment described here the matrix based function is the product of (a) a dependency matrix describing a desired distribution of power generation amounts between different wind turbines and (b) a setpoint vector, whereby each component of the setpoint vector represents an individual power setpoint of one of the plurality of wind turbines. The individual power setpoints do not take into account possible dependencies between different wind turbines.

Further, the described matrix based function comprises a correaction vector, which is subtracted from the result of multiplying the dependency matrix with the setpoint vector. The correction vector comprises a power correction value for each wind turbine, whereby each power correction value is indicative for a requested time rate of change of the total power output of the wind farm.

In an example, where the wind farm comprises five turbines, the matrix based function is structured as given in the following equation (1).

$$\underbrace{\begin{pmatrix} Pref\ T1 \\ Pref\ T2 \\ Pref\ T3 \\ Pref\ T4 \\ Pref\ T5 \end{pmatrix}}_{\substack{power \\ ref.\ vector}} = \underbrace{\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}}_{\substack{dependency \\ matrix}} \cdot \underbrace{\begin{pmatrix} Setpoint\ T1 \\ Setpoint\ T2 \\ Setpoint\ T3 \\ Setpoint\ T4 \\ Setpoint\ T5 \end{pmatrix}}_{\substack{setpoint \\ vector}} - \underbrace{\begin{pmatrix} Corr\ T1 \\ Corr\ T2 \\ Corr\ T3 \\ Corr\ T4 \\ Corr\ T5 \end{pmatrix}}_{\substack{correction \\ vector}} \quad (1)$$

It is mentioned that the matrix based function can be adapted to any number of wind turbines, which may be comprised by an arbitrary wind farm. Of course, the dimension of the respective vectors and the dependency matrix respective has to be adapted accordingly.

The setpoint vector contains an individual power setpoint for each wind turbine of the wind farm. The individual power setpoints are calculated with no regard to potential power generation dependencies between different wind turbines.

According to the embodiment described with equation (1), all wind turbines are controlled equally with respect to their actual power generation. This can be seen from the dependency matrix, which is the identity matrix respectively the unity matrix.

The power reference vector (power ref. vector) contains the calculated coordinated setpoints for each wind turbine.

All the individual power setpoints will in total give the desired actual wind farm power production as requested by a superordinate controller for controlling the operation of a wind farm. This is expressed with the following equation (2):

$$P\_desired = \sum_{i=1}^{N} SetpointTN \qquad (2)$$

Further, according to the embodiment described here the correaction vector is given by the following equation (3):

$$\begin{pmatrix} -\frac{dP_{Farm\ Setpoint}}{dt} \cdot \frac{1}{N\ turbines} \\ -\frac{dP_{Farm\ Setpoint}}{dt} \cdot \frac{1}{N\ turbines} \\ -\frac{dP_{Farm\ Setpoint}}{dt} \cdot \frac{1}{N\ turbines} \\ -\frac{dP_{Farm\ Setpoint}}{dt} \cdot \frac{1}{N\ turbines} \\ -\frac{dP_{Farm\ Setpoint}}{dt} \cdot \frac{1}{N\ turbines} \end{pmatrix} \qquad (3)$$

Thereby, $P_{Farm\ Setpoint}$ is the actual setpoint for the power production of the whole wind farm. N turbines is the number of wind turbines of the wind farm. Here, N turbines=5.

Generally speaking, the correction vector comprises a power correction value for each wind turbine, whereby each power correction value is indicative for a requested time rate of change of the total power output of the wind farm.

As can be seen from equation (3), the reduction of the coordinated setpoint values caused by the correction vector is proportional to the negative time derivative of the requested total power output of the wind farm. Correspondingly, if there is a decrease of the requested total output power the resulting coordinated power setpoints will also be decreased. The described proportionality to the negative time derivative may provide the advantage that sudden changes of the requested total power output will we forwarded to each wind turbine in a predicted manner. As a result the speed of the whole wind farm operation control may be increased significantly. This may yield a higher performance of a superordinate control system for the whole wind farm. Thereby, the probability of unwanted overshoots may be reduced.

According to an embodiment of the invention the setpoint vector contains a set of broadcasted individual setpoints. In this respect "broadcasted" means that that all wind turbines receive the same individual setpoint value from the superordinate control system.

In the following it is assumed that each of the five wind turbines is able to produce a nominal power of 1 Megawatt (MW). When all wind turbines are operated with their nominal power the total power produced by the whole wind farm is 5 MW. Subsequently the wind farm is curtailed to 3 MW only. This means that each turbine of the wind farm has to be curtailed with (5 MW−3 MW)/5=0.4 MW. As a consequence, the new setpoint vector will be:

$$\begin{pmatrix} 0.6\ MW \\ 0.6\ MW \\ 0.6\ MW \\ 0.6\ MW \\ 0.6\ MW \end{pmatrix} \qquad (4)$$

If the dependency matrix is left unchanged as the unity matrix (i.e. no dependencies or interactions between the different power productions), equation (1) converts to equation (5) given below:

$$\begin{pmatrix} Pref\ T1 \\ Pref\ T2 \\ Pref\ T3 \\ Pref\ T4 \\ Pref\ T5 \end{pmatrix} = \begin{pmatrix} Setpoint\ T1 \\ Setpoint\ T2 \\ Setpoint\ T3 \\ Setpoint\ T4 \\ Setpoint\ T5 \end{pmatrix} - \begin{pmatrix} Corr\ T1 \\ Corr\ T2 \\ Corr\ T3 \\ Corr\ T4 \\ Corr\ T5 \end{pmatrix} \qquad (5)$$

In the following it is assumed that the wind farm is still curtailed to 3 MW. However, in the meantime it has turned out that it is more efficient to operate the wind farm with the following dependencies:

(a) Setpoint T1=0.8·Setpoint T2 and
(b) Setpoint T4=1.2·Setpoint T2

Taking benefit of the matrix based coordinated setpoint calculation given by equation (1), the desired distribution of setpoints can be obtained simply by updating the design matrix. So for this distribution the design matrix will be:

$$\begin{pmatrix} 0 & 0.8 & 0 & 0 & 0 \\ 0 & 1 & 0 & 0 & 0 \\ 0 & 0 & 1 & 0 & 0 \\ 0 & 0 & 1.2 & 0 & 0 \\ 0 & 0 & 0 & 0 & 1 \end{pmatrix} \qquad (6)$$

Generally speaking, by adapting the dependency matrix in an appropriate manner any dependency for the amounts of power production of different wind turbines can be taken into account. The resulting matrix based calculation can be effectively performed in an iteration-free manner.

The FIGURE illustrates in accordance with an embodiment of the invention a flow diagram of a matrix based dispatching algorithm for controlling the operation of a plurality of wind turbines 101, 102, 103, 104, 105 of a wind farm 100.

The wind farm 100 is controlled by a superordinate controller 110. The superordinate controller 110 receives information about the amount of power production, which is currently requested to be fed to a grid respectively an electricity network 160, from a non-depicted controller of the grid 160. Based (a) on this information and (b) on the amount of power, which is currently produced by the wind farm 100, the superordinate controller 110 determines an updated reference value P for the whole power production. As can be seen from the FIGURE, a value being indicative for the amount of power, which is currently produced by the wind farm 100, is transferred to the superordinate controller 110 via a control line 162.

The updated reference value for the overall power output is transferred both to a definition unit 120 and to a correction vector determination unit 130. The definition unit 120 performs a selfish setpoint distribution. This means that for each wind turbine 101-105 an individual power setpoint is determined. The resulting individual power setpoints define a setpoint vector as defined in equation (1). The correction vector determination unit 130 determines a correction vector as defined above in equation (3). Thereby, the superordinate controller 110 together with the selfish setpoint distribution calculation unit 120 may make sure that the sum of the components of the setpoint vector does not exceed the power setpoint for the whole wind farm 100 (see equation (2)).

Further, the matrix based dispatching algorithm illustrated in the FIGURE is capable of performing an operation optimization for the whole wind farm 100 and/or for individual wind turbines 101-105. This is done with an optimization control unit 150, which is capable of initiating different optimization routines such as a "Low Noise Operation", a "Power Optimization", a mechanical "Load Optimization" and/or any other "Site specific Control". It is pointed out that the described list of operational modes is not exclusive. Thereby, the optimization routines may be applied to one or more of the wind turbines 101-105. Also a combination of optimization routines may be selected.

Based on the selected optimization routine(s), the dependency matrix as defined in equations (1) or (6) is determined. It is mentioned that the selection of appropriate optimization routines may depend on the actual operation condition of one or more wind turbines 101-105. As a consequence, the dependency matrix may be time dependent and a continuous modeling or updating of the dependency matrix may contribute that the wind farm 100 is always operated in an appropriate manner.

The actual dependency matrix, the setpoint vector determined by the definition unit 120 and the correction vector determined by the correction vector determination unit 130 are fed to a determination unit 140. The determination unit 140 performs a matrix based dispatching. Thereby, instead of the unity matrix a matrix may be used, which reflects power generation dependencies between different wind turbines 101-105. Specifically, based on equation (1) the determination unit 140 calculates a coordinated power setpoint for each wind turbine. The coordinated power setpoints define a power reference vector, which is fed to the wind farm 100. Specifically, each coordinated power setpoint is provided to the corresponding wind turbine 101, 102, 103, 104 or 105. Last but not least the operation of the wind farm 100 is controlled based on the calculated power reference vector.

With the described matrix based dispatching algorithm it is possible to specify with ease the required power generation distribution based on a selection of different optimization routines. So if one were for example to go from a general Power Optimization to a Site Specific Control, one would simply have to trigger the appropriate function in order to model an appropriate updated dependency matrix.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling an operation of a wind farm comprising a plurality of wind turbines, the method comprising defining a setpoint vector, wherein each component of the setpoint vector represents an individual power setpoint of one of the plurality of wind turbines;

determining a dependency matrix, which reflects a desired power generation distribution between different wind turbines of the plurality of wind turbines;

calculating a power reference vector by multiplying the dependency matrix with the setpoint vector, such that the power reference vector comprises a coordinated power setpoint for each wind turbine; and controlling the operation of the wind farm based on the calculated power reference vector, wherein calculating the power reference vector further comprises adding a correction vector to the result of multiplying the dependency matrix with the setpoint vector, and wherein the correction vector comprises a power correction value for each wind turbine, whereby each power correction value is indicative for a requested time rate of change of the total power output of the wind farm.

2. The method as set forth in claim 1, wherein each individual power setpoint is determined based on an individual nominal power output of the respective wind turbine and a requested total power output of the whole wind farm.

3. The method as set forth in claim 2, wherein a sum of all individual power setpoints corresponds to the requested total power output of the whole wind farm.

4. The method as set forth in claim 1, wherein each power correction value is proportional to the time derivative of the requested total power output of the wind farm.

5. The method as set forth in claim 4, wherein each power correction value is proportional to the negative time derivative of the requested total power output of the wind farm.

6. The method as set forth in claim 1, wherein at least one element of the dependency matrix depends on a type of operation of at least one wind turbine.

7. A superordinate control system for controlling the operation of a wind farm comprising a plurality of wind turbines, the superordinate control system comprising a definition unit for defining a setpoint vector, wherein each component of the setpoint vector represents an individual power setpoint of one of the plurality of wind turbines;

a determination unit for determining a dependency matrix, which reflects a desired power generation distribution between different wind turbines of the plurality of wind turbines;

a calculation unit for calculating a power reference vector by multiplying the dependency matrix with the setpoint vector, such that the power reference vector comprises a coordinated power setpoint for each wind turbine; and a control unit for controlling the operation of the wind farm based on the calculated power reference vector, wherein calculating the power reference vector further comprises adding a correction vector to the result of multiplying the dependency matrix with the setpoint vector, and wherein the correction vector comprises a power correction value for each wind turbine, whereby each power correction value is indicative for a requested time rate of change of the total power output of the wind farm.

8. The superordinate control system as set forth in claim 7, further comprising a computer-readable medium on which there is stored a computer program which when being executed by a data processor is adapted for controlling the operation of a plurality of wind turbines.

9. A wind farm for generating electric power, the wind farm comprising a plurality of wind turbines each comprising an individual control unit for controlling the operation of the respective wind turbine; and a superordinate control system for controlling the operation of a wind farm comprising a plurality of wind turbines, the superordinate control system comprising:

a definition unit for defining a setpoint vector, wherein each component of the setpoint vector represents an individual power setpoint of one of the plurality of wind turbines, a determination unit for determining a dependency matrix, which reflects a desired power generation distribution between different wind turbines of the plurality of wind turbines, a calculation unit for calculating a power reference vector by multiplying the dependency matrix with the setpoint vector, such that the power reference vector comprises a coordinated power setpoint for each wind turbine, and a control unit for controlling the operation of the wind farm based on the calculated power reference vector, wherein the superordinate control system is connected to each individual control unit, wherein calculating the power reference vector further comprises adding a correction vector to the result of multiplying the dependency matrix with the setpoint vector, and wherein the correction vector comprises a power correction value for each wind turbine, whereby each power correction value is indicative for a requested time rate of change of the total power output of the wind farm.

* * * * *